(12) United States Patent
Ryu et al.

(10) Patent No.: US 11,274,207 B2
(45) Date of Patent: Mar. 15, 2022

(54) CONDUCTIVE POLYARYLENE SULFIDE RESIN COMPOSITION

(71) Applicant: LG CHEM, LTD., Seoul (KR)

(72) Inventors: Hyun Woog Ryu, Daejeon (KR); Joong Jin Han, Daejeon (KR); Eunju Park, Daejeon (KR); Kwonsu Jung, Daejeon (KR); Hansol Kim, Daejeon (KR); Jong Hyun Chae, Daejeon (KR); Daeil Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 205 days.

(21) Appl. No.: 16/500,031

(22) PCT Filed: Oct. 30, 2018

(86) PCT No.: PCT/KR2018/013027
§ 371 (c)(1),
(2) Date: Oct. 1, 2019

(87) PCT Pub. No.: WO2019/088665
PCT Pub. Date: May 9, 2019

(65) Prior Publication Data
US 2020/0172732 A1 Jun. 4, 2020

(30) Foreign Application Priority Data
Oct. 30, 2017 (KR) .................. 10-2017-0142610

(51) Int. Cl.
C08L 81/02 (2006.01)
C08J 5/18 (2006.01)
C08K 5/375 (2006.01)
C08L 25/18 (2006.01)

(52) U.S. Cl.
CPC .............. C08L 81/02 (2013.01); C08J 5/18 (2013.01); C08K 5/375 (2013.01); C08L 25/18 (2013.01); C08L 2201/08 (2013.01); C08L 2203/16 (2013.01)

(58) Field of Classification Search
None
See application file for complete search history.

(56) References Cited

U.S. PATENT DOCUMENTS 5,173,524 A 12/1992 Ueki et al.
5,371,134 A * 12/1994 Inoue ..................... C08L 79/08
252/502

2006/0003210 A1 1/2006 Ofer et al.
2007/0224412 A1* 9/2007 Hara ....................... B32B 27/36
428/336
2009/0181234 A1 7/2009 Yoshino
2009/0220796 A1 9/2009 Kato et al.
2010/0136329 A1 6/2010 Kato et al.
2013/0222978 A1 8/2013 Sugawara et al.
2016/0060397 A1 3/2016 Watanabe et al.
2017/0263349 A1 9/2017 Jeong et al.
2018/0354167 A1* 12/2018 Robbrecht ............ B29C 48/022

FOREIGN PATENT DOCUMENTS

| CN | 103289399 A | 9/2013 |
|---|---|---|
| CN | 103958552 A | 7/2014 |
| CN | 105051092 A | 11/2015 |
| CN | 106688048 A | 5/2017 |
| EP | 0451803 A1 | 10/1991 |
| EP | 0581541 A1 | 2/1994 |
| JP | 5721456 A | 2/1982 |
| JP | S57021456 A | 2/1982 |
| JP | 04314759 A | 11/1992 |
| JP | 2005145987 A | 6/2005 |
| JP | 2008500701 A | 1/2008 |
| JP | 2009209216 A | 9/2009 |
| JP | 2009209241 A | 9/2009 |
| JP | 2009280654 A | 12/2009 |
| JP | 2010198793 A | 9/2010 |
| JP | 2011054545 A | 3/2011 |
| JP | 2011105936 A | 6/2011 |
| JP | 2013172142 A | 9/2013 |
| JP | 2013-245288 A | 12/2013 |
| JP | 2015105315 A | 6/2015 |
| JP | 5821213 B2 | 11/2015 |
| JP | 2017114968 A | 6/2017 |
| KR | 100971162 B1 | 7/2010 |
| KR | 101488482 B1 | 2/2015 |
| KR | 1020150136846 A | 12/2015 |
| KR | 101695226 B1 | 1/2017 |
| KR | 10-2019-0048092 A | 5/2019 |
| WO | 00/17273 A1 | 3/2000 |
| WO | 2013073259 A1 | 4/2015 |

OTHER PUBLICATIONS

Machine translation of Hideaki et al. WO2013073259 (Year: 2013).*

* cited by examiner

Primary Examiner — Robert T Butcher
(74) Attorney, Agent, or Firm — Dentons US LLP

(57) ABSTRACT

The present invention provides a polyarylene sulfide resin composition comprising a mixture of polyarylene sulfide and a binder resin having excellent electrical conductivity and high temperature stability.

9 Claims, 6 Drawing Sheets

CONDUCTIVE POLYARYLENE SULFIDE RESIN COMPOSITION

The present application is a National Phase entry pursuant to 35 U.S.C. § 371 of International Application No. PCT/KR2018/013027 filed on Oct. 30, 2018, and claims priority to and the benefit of Korean Patent Application No. 10-2017-0142610 filed in the Korean Intellectual Property Office on Oct. 30, 2017, the entire contents of which are incorporated herein by reference.

FIELD

The present invention relates to a conductive polyarylene sulfide resin composition having excellent electrical conductivity and high temperature stability to be particularly useful to manufacture a conductive polymer film.

BACKGROUND

Polyarylene sulfide (PAS), which is represented by polyphenylene sulfide (PPS), is widely used as a substitute for a metal, especially a die cast metal such as aluminum or zinc in automobiles, electrical and electronic products, machinery, and the like, due to excellent strength, heat resistance, flame retardancy and processability. In particular, PPS resin has good fluidity, which is advantageous to be used as a compound by kneading with a filler such as glass fiber, or the like, or a reinforcing agent.

Generally, PPS polymer is a non-conductive material that does not have electrical conductivity. There has been an attempt to impart electrical conductivity through sulfonation, but this attempt has not been actively studied. Particularly, there is difficulty in selecting an acidic solvent and in controlling an acid treatment time, and the like, at the time of sulfonation of the PPS polymer.

As another method, a method of mixing a PPS resin with a conductive carbon has been proposed. However, the conductive carbon has difficulty forming a film due to poor kneadability with the PPS resin, and does not have a sufficient effect of imparting conductivity.

SUMMARY

Accordingly, an object of the present invention is to a conductive polyarylene sulfide resin composition having excellent electrical conductivity and high temperature stability.

Another object of the present invention is to provide a resin composition for forming a conductive polymer film including the composition as described above, a conductive polymer film prepared by using the same, and a manufacturing method thereof. An exemplary embodiment of the present invention provides a conductive polyarylene sulfide resin composition including a mixture of polyarylene sulfide and a binder resin having a decomposition temperature (Td) of 310° C. or more, wherein the binder resin is included in an amount of 5 wt % or more to less than 50 wt % based on a total weight of the mixture.

Another embodiment of the present invention provides a resin composition for forming a conductive polymer film, including the conductive polyarylene sulfide resin composition as described above.

Yet another embodiment of the present invention provides a method for preparing a conductive polymer film including: pressurizing and heating the resin composition for forming a conductive polymer film as described above at a temperature of 200 to 350 □ and a pressure of 1 to 10 MPa for 10 seconds or more to 10 minutes or less.

Yet another embodiment of the present invention provides a conductive polymer film, which is prepared by the above-described method, including: polyarylene sulfide and a binder resin having a decomposition temperature (Td) of 310□ or more in a weight ratio of 95:5 or more to less than 50:50, wherein the conductive polymer film has a thickness of 0.1 to 0.2 mm and a sheet resistance value of $10^9$ to $10^{12}$ Ω/sq.

The conductive polyarylene sulfide resin composition according to the present invention has excellent electrical conductivity and high temperature stability. Therefore, the conductive polyarylene sulfide resin composition is particularly useful to form a conductive polymer film by high-temperature pressurization.

DETAILED DESCRIPTION

Figure 1:
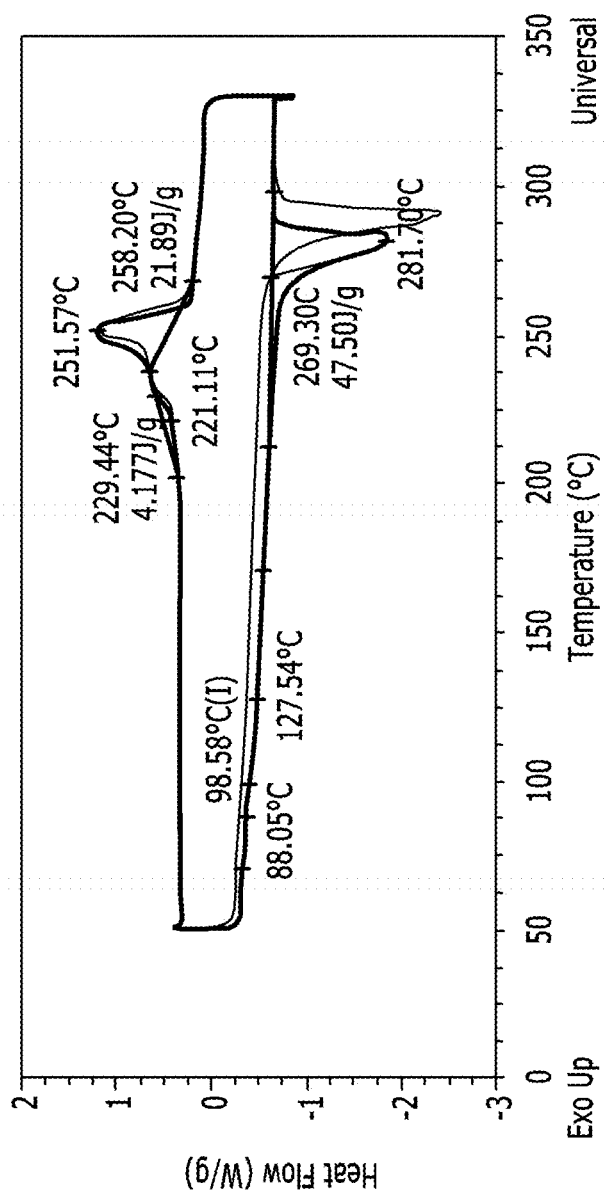
FIG. 1 is a graph showing thermal analysis results of a conductive polymer film prepared in Example 1 using differential scanning calorimetry (Q2000 DSC).

Hereinafter, the present invention is more specifically described. In addition, the present invention may be variously modified and may have various forms, and thus specific embodiments are illustrated and described in detail below. It should be understood, however, that these embodiments are not intended to limit the present invention to specific disclosed forms, and includes all modifications, equivalents, and alternatives falling within the spirit and technical scope of the present invention.

Further, the meaning of the term "comprising" used in the specification of the present invention embodies specific features, areas, integers, steps, operations, elements and/or components, and does not exclude presence or addition of other characteristics, regions, integers, steps, operations, elements, and/or components.

Hereinafter, a composition for forming a conductive polymer film according to a specific embodiment of the present invention, a manufacturing method thereof, and a conductive polymer film prepared by using the same, and the like, are described.

A conductive polyarylene sulfide resin composition according to an embodiment of the present invention may include:

a mixture of polyarylene sulfide and a binder resin having a decomposition temperature (Td) of 310° C. or more, wherein the binder resin is included in an amount of 5 wt % or more to less than 50 wt %, based on a total weight of the mixture.

As described above, in the present invention, by using the binder having a controlled decomposition temperature without performing a sulfonation process for polyarylene sulfide represented by polyphenylene sulfide (PPS), the polyarylene sulfide may have electrical conductivity while simultaneously having improved high temperature stability.

Specifically, in the conductive polyarylene sulfide resin composition according to an embodiment of the present invention, the polyarylene sulfide includes a structure in which an aromatic ring and a sulfur atom are bonded to each other as a repeating unit. More specifically, the polyarylene sulfide may be polyphenylene sulfide including a repeating unit represented by Chemical Formula 1 below:

[Chemical Formula 1]

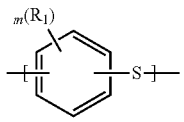

wherein, in Chemical Formula 1, $R_1$ is each independently selected from the group consisting of a hydrogen atom, a C1-C6 alkyl group, a C1-C6 alkoxy group, a nitro group, an amino group, and a phenyl group, and m is an integer of 0 to 4.

Further, in Chemical Formula 1 above, the sulfur atom (S) may be bonded to an aromatic ring at various positions such as para and meta, and the like, but the bond at the para position may exhibit better heat resistance and crystallinity.

In addition, the polyarylene sulfide may have a number average molecular weight of 5,000 to 100,000 g/mol, and more specifically 10,000 to 50,000 g/mol.

In the present invention, the number average molecular weight (Mn) of the polyarylene sulfide means a standard polystyrene conversion value measured by high temperature gel permeation chromatography (GPC).

Specifically, the number average molecular weight may be measured using Agilent Technologies 260 Infinity II HT-GPC. Here, an evaluation temperature is set to 195 to 220 □, 1,2,4-trichlorobenzene (TBC) may be used as a solvent, and a flow rate is set to 1 mL/min. Further, the specimen is prepared at a concentration of 0.0025 to 0.001 g/ml and then supplied in an amount of 100 to 200 μL. The value of Mn is derived using a calibration curve formed using polystyrene standards. As molecular weights (g/mol) of the polystyrene standard products, 9 kinds are used, for example, 2,000/10,000/30,000/70,000/200,000/700,000/2,000,000/4,000,000/10,000,000.

In addition, the polyarylene sulfide has a melt mass-flow rate (MFR) of 10 to 10,000 g/10 min, and more specifically, 10 to 1,000 g/10 min, measured at 315□ at a pressure of 2.16 kg using melt flow index (MI) equipment. When the polyarylene sulfide has the MFR within the above-described range, the resin composition including the polyarylene sulfide may exhibit excellent processability and film formability.

Further, under conditions satisfying the above-described weight average molecular weight, the degree of dispersion, and the MFR, the polyarylene sulfide may have a melting temperature (Tm) of 220 to 350 □ and a crystallization temperature (Tc) of 200 to 330 □, more specifically, a Tm of 240 to 330 □ and a Tc of 220 to 310 □, measured using differential scanning calorimetry (DSC).

The polyarylene sulfide satisfying these physical property requirements simultaneously may exhibit mechanical strength and processability together with excellent heat resistance at the time of preparing the resin composition.

In the present invention, specifically, the melting temperature (Tm) and the crystallization temperature (Tc) of polyarylene sulfide are measured using a differential scanning calorimeter (DSC) Q2000 (prepared by TA instrument), wherein a specimen is charged in an amount of about 0.5 mg to 10 mg into a measurement container, a nitrogen gas flow rate is set to 10 ml/min, a temperature raising and lowering cycle including: raising a temperature of polyarylene sulfide from 50□ to 330□ at a rate of 20□/min, then maintaining this state for 5 minutes, and cooling the temperature from 330□ to 50□ at a rate of 20□/min, is performed once, and then is repeated once more at a rate of 20□/min. As a graph for the analysis, a graph of the second temperature rising and lowering cycle is used, and a heat flow change is measured. A peak of a heating curve in a section where the second temperature rises in the measured heat flow change curve is determined as the melting temperature (Tm), and a peak of a cooling curve, i.e., an exothermic peak temperature during cooling is determined as the crystallization temperature (Tc).

The term "peak" used in the specification means a vertex or an apex of the cooling curve or the heating curve, and indicates, for example, a point where a slope of the tangent is zero. However, a point where a sign value of the slope of the tangent is not changed based on a point where the slope of the tangent is 0 among points where the slope of the tangent is 0, i.e., an inflection point is excluded.

Meanwhile, in the polyarylene sulfide resin composition according to an embodiment of the present invention, the binder resin serves to impart an electron-donating function to an electron transfer region formed by π-π conjugation of an aromatic ring between polyarylene sulfide main chains to exhibit electrical conductivity, wherein the binder resin may have a decomposition temperature (Td) of 310□ or more.

When the decomposition temperature of the binder resin is less than 310□, the binder resin is thermally decomposed at a temperature near the melting temperature of polyarylene sulfide at the time of forming the film, and thus it is difficult to exhibit sufficient electrical characteristics. Further, when the film is formed at a temperature lower than the above-described range, polyarylene sulfide is not melted sufficiently, and there is a powdery phase in a mixed state, and thus film formability and electrical conductivity may be deteriorated. More specifically, the binder resin may have a decomposition temperature (Td) of 310 to 500□, and more specifically 350 to 400□.

In the present invention, the decomposition temperature (Td) of the binder resin may be measured using a thermogravimetric analyzer. Specifically, the decomposition temperature (Td) of the binder resin may be measured by charging about 0.5 mg to 10 mg of the specimen in the measurement container and heating the specimen at a heating rate of 10□/min from room temperature to 500□ under a nitrogen atmosphere, using a thermogravimetric analyzer EQC-0220 TGA (Mettler Toledo).

More specifically, the binder resin may include an aromatic ring structure in a molecule, and may further include a sulfur atom bonded directly to the carbon atoms constituting the aromatic ring or bonded to a carbon atom other than the carbon atoms constituting the aromatic ring. The binder resins satisfying the above-described structural characteristics have excellent miscibility (or kneadability) simultaneously while exhibiting excellent electrical conductivity with respect to polyarylene sulfide. Further, these binder resins are included in a simply mixed state without being bonded to the polyarylene sulfide main chain, and thus there is no change in physical properties due to crosslinking of the polyarylene sulfide main chain.

Specific examples of the above-described binder resin may include any one, or a mixture of two or more, selected from polystyrene sulfonate, aromatic sulfonate, and the like.

Among these binder resins, the binder resin may be polystyrene sulfonate (PSS), which includes a sulfonate group as a pendent group capable of forming a charge transfer complex with other compounds in a basic skeleton structure, having excellent miscibility with polyarylene sulfide, having an excellent effect of improving electrical conductivity, and exhibiting excellent thermal stability even at a high temperature, particularly, at the Td temperature or higher of polyarylene sulfide. Thus, there is no concern about elution during the high-temperature pressurization process for forming a film, and more specifically, may include a repeating unit represented by Chemical Formula 2 below:

[Chemical Formula 2]

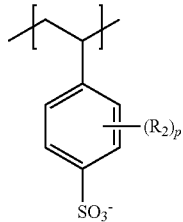

wherein, in Chemical Formula 2, $R_2$ is each independently a hydrogen atom or a C1-C6 alkyl group, and p is an integer of 0 to 4.

Further, the polystyrene sulfonate may have a weight average molecular weight (Mw) of 10,000 to 1,000,000 g/mol, more specifically 20,000 to 100,000 g/mol, and further specifically, 35,000 to 70,000 g/mol. When the polystyrene sulfonate has a weight average molecular weight having the above-described value, the polystyrene sulfonate may exhibit better miscibility with polyarylene sulfide, and as a result, the resin composition including the polystyrene sulfonate may exhibit excellent mechanical properties together with excellent high temperature stability.

In the present invention, the weight average molecular weight (Mw) of the polyarylene sulfonate means a standard polystyrene conversion value measured by high temperature gel permeation chromatography (GPC). Specifically, the weight average molecular weight may be measured using Agilent Technologies 260 Infinity II HT-GPC. Here, an evaluation temperature is set to 195 to 220☐, 1,2,4-trichlorobenzene (TBC) may be used as a solvent, and a flow rate is set to 1 mL/min. Further, the specimen is prepared at a concentration of 0.0025 to 0.001 g/ml and then supplied in an amount of 100 to 200 μL. The value of Mw is derived using a calibration curve formed using polystyrene standards. As molecular weights (g/mol) of the polystyrene standard products, 9 kinds are used, for example, 2,000/10,000/30,000/70,000/200,000/700,000/2,000,000/4,000,000/10,000,000.

The above-described binder resin is included in an amount of 5 wt % or more to less than 50 wt %, with respect to the total weight of the mixture including the polyarylene sulfide and the binder resin.

When the amount of the binder resin is less than 5 wt %, the effect of improving electrical conductivity is not signifi-cant. When the amount exceeds 50 wt %, it is difficult to obtain uniform mixing with polyarylene sulfide. Accordingly, polystyrene sulfonate may be eluted during the high-temperature pressurization process for forming a film, and mechanical strength of the film may be greatly reduced due to lowering of kneadability, thus resulting in breakage of the film while forming a compartment when an external force is generated. Considering that the resin composition and the film have an excellent effect of improving electrical conductivity and film formability according to the control of the amount of the polystyrene sulfonate in the mixture, the polystyrene sulfonate may be included in an amount of 20 wt % or more to less than 50 wt %, and more specifically, 20 wt % to 40 wt %.

Meanwhile, the polyarylene sulfide resin composition according to an embodiment of the present invention may further include one or more other additives such as a coupling agent, a filler, an impact resistance imparting agent, a reinforcing agent, a releasing agent, a colorant, an antioxidant, a heat stabilizer, a UV stabilizer, a UV absorbent, a foaming agent, a flame retardant, a flame retardant aid, an anti-rust agent, a lubricant, a crystal nucleating agent, and the like, in order to improve physical properties according to the use of the resin composition.

Specifically, when the coupling agent is further included, the coupling agent may be a silane-based coupling agent or a titanium-based coupling agent. More specifically, the coupling agent may be any one, or a mixture of two or more, selected from: an epoxy group-containing alkoxysilane compounds such as γ-glycidoxypropyltrimethoxysilane, γ-glycidoxypropyltriethoxysilane, and β-(3,4-epoxycyclohexyl)ethyltrimethoxysilane, and the like; an isocyanato group-containing alkoxysilane compounds such as γ-isocyanatopropyltrimethoxysilane, γ-isocyanatopropyltriethoxysilane, γ-isocyanatopropylmethyldimethoxysilane, γ-isocyanatopropylmethyldiethoxysilane, γ-isocyanatopropylethyldimethoxysilane, γ-isocyanatopropylethyldiethoxysilane, γ-isocyanatopropyltrichlorosilane, and the like; an amino group-containing alkoxysilane compounds such as γ-(2-aminoethyl)aminopropylmethyldimethoxysilane, γ-(2-aminoethyl)aminopropyltrimethoxysilane, γ-aminopropyltrimethoxysilane, and the like; a hydroxyl group-containing alkoxysilane compounds such as γ-hydroxypropyltrimethoxysilane, γ-hydroxypropyltriethoxysilane, and the like. The coupling agent may be included in an amount of 10 wt % or less, and more specifically 0.01 to 5 wt % or less, with respect to the total weight of the conductive polyarylene sulfide resin composition. When the amount of coupling agent has the above-described value, mechanical strength characteristics of the polyarylene sulfide resin composition may be improved, and a viscosity thereof may be increased to impart excellent moldability.

Further, when the filler is further included, the filler may be specifically any one, or a mixture of two or more, selected from: metal materials such as nickel, copper, gold, silver, aluminum, zinc, nickel, tin, lead, chromium, platinum, palladium, tungsten, molybdenum, and the like, alloys, mixtures or intermetallic compounds thereof; or carbon-based materials such as artificial graphite, natural graphite, glassy carbon, carbon black, acetylene black, Ketjenblack, carbon fiber, carbon nanotube, and the like. Further, the filler may be surface-treated with a silanol group-containing compound, or the like, in order to improve miscibility with polyarylene sulfide.

The filler may be included in an amount of 10 wt % or less, and more specifically 1 to 5 wt % or less, with respect to the total weight of the conductive polyarylene sulfide resin composition. When the amount of filler has the above-described value, mechanical strength characteristics and conductivity of the polyarylene sulfide resin composition may be improved without concern of deterioration of moldability.

Further, when an impact resistance imparting agent is further included, the impact resistance imparting agent may specifically be a thermoplastic elastomer, or the like, obtained by copolymerizing an α-olefin and a vinyl polymerizable compound. Examples of the α-olefin may include C2-C8 α-olefins such as ethylene, propylene, 1-butene, and the like, and examples of the vinyl polymerizable compound may include α,β-unsaturated carboxylic acids and alkyl esters thereof such as (meth)acrylic acid, (meth)acrylic acid ester, and the like; α,β-unsaturated dicarboxylic acids and derivatives thereof such as maleic acid, fumaric acid, itaconic acid, and the like; glycidyl (meth) acrylate, and the like.

The impact resistance imparting agent may be included in an amount of 20 wt % or less, and more specifically 5 to 10 wt % or less, with respect to the total weight of the conductive polyarylene sulfide resin composition. When the amount of impact resistance imparting agent has the above-described value, excellent moldability and releasability may be exhibited together with excellent impact resistance and tensile strength characteristics.

Further, when a reinforcing agent is further included, the reinforcing agent may be specifically any one, or a mixture of two or more, selected from: silica, alumina, glass beads, glass fibers, carbon fibers, boron nitride, talc, silicates (alumina silicate, and the like), silicon chloride, silicon carbide, metal oxides (magnesium oxide, zirconium oxide, titanium oxide, and the like), carbonates (calcium carbonate, magnesium carbonate, dolomite, and the like), and sulfates (calcium sulfate, barium sulfate, and the like).

The reinforcing agent may be included in an amount of 10 wt % or less, and more specifically 1 to 7 wt % or less, with respect to the total weight of the conductive polyarylene sulfide resin composition. When the amount of reinforcing agent has the above-described value, strength, rigidity, heat resistance, dimensional stability, and the like, of the resin composition may be improved.

In addition, the conductive polyarylene sulfide resin composition according to an embodiment of the present invention may further include synthetic resins such as a polyester resin, a polyamide resin, a polyimide resin, a polyetherimide resin, a polycarbonate resin, a polyphenylene ether resin, a polysulfone resin, a polyethersulfone resin, a polyether ether ketone resin, a polyether ketone resin, a polyarylene resin, a polyethylene resin, a polypropylene resin, a polytetrafluoroethylene resin, a polydifluoroethylene resin, a polystyrene resin, an ABS resin, a phenol resin, an urethane resin, a liquid crystal polymer, and the like, or elastomers such as fluorine rubber, and the like, together with the above-described components, depending on the use. Amounts of these other polymer resins may be suitably determined according to the use of the resin composition within a range not hindering the effect of the present invention.

The conductive polyarylene sulfide resin composition according to an embodiment of the present invention may include the polyarylene sulfide and the binder resin which imparts electrical conductivity with respect to the polyarylene sulfide, and has a high decomposition temperature, thereby exhibiting remarkably improved thermal stability together with excellent electrical conductivity. Further, in the resin composition, the polystyrene sulfonate is included in a simply mixed state, without forming a reaction product by doping or reacting to the polyarylene sulfide. Further, due to excellent miscibility of the polystyrene sulfonate with respect to the polyarylene sulfide, a homogeneous mixture may be formed to exhibit excellent thermal stability without changing thermal behavior before and after kneading. Thus, the resin composition may exhibit excellent film formability when the conductive polymer film is formed by high-temperature pressurization.

Thus, according to another embodiment of the present invention, there is provided a composition for forming a conductive polymer film including the conductive polyarylene sulfide resin composition as described above, an electroconductive polymer film using the same, and a manufacturing method thereof.

The composition for forming a conductive polymer film may include the conductive polyarylene sulfide resin composition as described above, and may further include a solvent and other additives capable of enhancing film formability, as required.

Further, the conductive polymer film may be prepared by a conventional film forming method, except that the above-described composition for forming a conductive polymer film is used.

For example, the conductive polymer film may be prepared by injecting the composition for forming a conductive polymer film into a film forming apparatus, followed by high-temperature pressurization.

The composition for forming an electroconductive polymer film may be injected into the apparatus in an amount such that a thickness of the finally produced film is 0.01 to 1 mm.

Next, the high-temperature pressurization process may be performed by pressurizing and heating the composition for forming an electroconductive polymer film or a coating film prepared thereby.

Specifically, the high-temperature pressurization process may be performed at a temperature of 200 to 350□ and a pressure of 1 to 10 MPa for 10 seconds or more to 10 minutes or less.

If the temperature is less than 200□ or the pressure is less than 1 MPa during high-temperature pressurization process, the film may not be formed or two polymers may not be mixed sufficiently. If the temperature exceeds 350□ or the pressure exceeds 10 MPa, the polymer may be discolored, or a crosslinking of the polymer chains may be generated and thus physical properties of the polymer itself may be changed.

If the high-temperature pressurization process is performed for more than 10 minutes under the above-described conditions, a large number of pores may be generated and the polymer may be discolored to brown or dark brown. If the high-temperature pressurization process is performed for less than 10 seconds, the film may not be formed, or the two polymers may not be mixed sufficiently.

Thus, considering the improvement of the film formability and the film property by simultaneously controlling the temperature, the pressure, and the time, the high-temperature pressurization process may be performed for 30 seconds or more to less than 5 minutes, or for 30 seconds or more to 2 minutes or less, at a temperature of 290 to 310□, and at a pressure of 5 to 7 MPa.

The conductive polymer film manufactured according to the above-described method may be applied to various fields due to excellent electrical conductivity and thermal stability.

Specifically, the conductive polymer film may include polyarylene sulfide and the binder resin having a decomposition temperature (Td) of 310□ or more in a weight ratio of 95:5 or more to less than 50:50, and may have a thickness of 0.1 to 0.2 mm, and a sheet resistance value of $10^9$ to $10^{12}$ Ω/sq. More specifically, the conductive polymer film may include polyarylene sulfide and the binder resin having a decomposition temperature (Td) of 310□ or more in a weight ratio of 80:20 or more to less than 60:40, and may have a thickness of 0.1 to 0.2 mm, and a sheet resistance value of $10^9$ to $10^{10}$ Ω/sq. Here, the polyarylene sulfide and the binder resin are the same as described above.

EXAMPLES

Hereinafter, action and effects of the present invention are described in more detail through specific Examples of the present invention. However, these Examples are provided as an example of the invention, and thus these Examples do not limit the scope of the invention in any way.

Hereinafter, materials used in the following Examples and Comparative Examples are described as follows:

PPS: polyphenylene sulfide (Mn: 18,000 g/mol, MFR: 821 g/10 min (at 315□, 2.16 kg), melt viscosity: 41.52 Pa·s, yield: 91%, Tm: 280.65° C., Tc: 238□)

PSS-1: polystyrene sulfonate (Mw: 70,000 g/mol, Td: 400□)

PSS-2: polystyrene sulfonate (Mw: 35,000 g/mol, Td: 320□)

PSS-3: polystyrene sulfonate (Mw: 10,000 g/mol, Td: 250□)

DDQ: 2,3-dichloro-5,6-dicyano-p-benzoquinone (Td: 250 to 280□, Mw: 227 g/mol)

Example 1

95 wt % of PPS and 5 wt % of PSS-1 as a binder resin were mixed to prepare a conductive polyarylene sulfide resin composition. The prepared composition for forming a conductive polymer film was injected into a high-temperature press apparatus, and maintained at 300□ and 7 MPa for 1 minute to form a film (film thickness of 0.14 mm). The weight average molecular weight of PSS-1 used in the film was 70,000 g/mol, and no cracking occurred during the manufacture of the film.

Examples 2 to 5

Conductive polyarylene sulfide resin compositions and conductive polymer films were prepared in the same manner as in Example 1 except that the amount of PSS-1 in the mixture of PPS and PSS-1 in Example 1 was changed to 10 wt %, 20 wt %, 30 wt %, and 40 wt %, respectively (film thickness of 0.14 mm). The weight average molecular weight of PSS-1 used in the film was 70,000 g/mol, and no cracking occurred during the manufacture of the film.

Example 6

95 wt % of PPS and 5 wt % of PSS-2 as a binder resin were mixed to prepare a conductive polyarylene sulfide resin composition. The prepared composition as a composition for forming a conductive polymer film was injected into a high-temperature press apparatus, and maintained at 300□ and 7 MPa for 1 minute to form a film (film thickness of 0.14 mm). The weight average molecular weight of PSS-2 used in the film was 35,000 g/mol, and no cracking occurred during the manufacture of the film.

Comparative Example 1

A conductive polyarylene sulfide resin composition and a conductive polymer film were prepared in the same manner as in Example 1 except that PSS-1, which was the binder resin in Example 1, was not used (film thickness of 0.14 mm). No cracking occurred during the manufacture of the film.

Comparative Example 2

A conductive polyarylene sulfide resin composition was prepared in the same manner as in Example 1 except that the amount of PSS-1 in the mixture of PPS and PSS in Example 1 was changed to 50 wt %, and a conductive polymer film was prepared in the same manner as in Example 1 using the prepared conductive polyarylene sulfide resin composition. However, the film was not formed due to an excessive amount of PSS, and the film was released. Meanwhile, the weight average molecular weight of PSS-1 used in the film was 70,000 g/mol.

Comparative Example 3

A conductive polyarylene sulfide resin composition was prepared in the same manner as in Example 1 except that DDQ having a Td of 280□ or less was used instead of PSS-1 used as the binder resin in Example 1.

The conductive polymer film was prepared in the same manner as in Example 1 except that the polyarylene sulfide resin composition prepared above was used. However, DDQ was degraded when heating at 280□ or more, which is a melting temperature of PPS, due to a low Td of DDQ, and as a result, it was not possible to manufacture a conductive polymer film.

Comparative Example 4

A conductive polyarylene sulfide resin composition was prepared in the same manner as in Comparative Example 3 except that DDQ was used in an amount of 20 wt %. Thereafter, there was an attempt to manufacture a conductive polymer film using the conductive polyarylene sulfide resin composition. However, due to the low Td of DDQ, it was not possible to manufacture a conductive polymer film.

Comparative Example 5

95 wt % of PPS and 5 wt % of PSS-3 as a binder resin were mixed to prepare a conductive polyarylene sulfide resin composition. The prepared composition as a composition for forming a conductive polymer film was injected into a high-temperature press apparatus, and maintained at 300□ and 7 MPa for 1 minute to form a film. The weight average molecular weight of PSS-3 used for the film was 10,000 g/mol, and during the manufacture of the film, a number of pores were generated, and the discoloration of dark brown and black occurred. Finally, no film was formed.

Comparative Example 6

95 wt % of PPS and 5 wt % of PSS-3 as a binder resin were mixed to prepare a conductive polyarylene sulfide resin composition. The prepared composition as a composition for forming a conductive polymer film was injected into a high-temperature press apparatus, and maintained at 300□ and 7 MPa for 30 seconds to form a film. The weight average molecular weight of PSS-3 used for the film was 10,000 g/mol, and during the manufacture of the film, a number of pores were generated, and the discoloration of dark brown occurred. Finally, no film was formed.

Experimental Example 1

The resin composition and the conductive polymer film prepared in Example 1 were subjected to thermal analysis using differential scanning calorimetry (DSC). The results are shown in FIG. 1. For reference, DSC analysis results of Tm and Tc of PPS alone are shown in FIG. 2.

Specifically, a heat flow change was measured using differential scanning calorimeter (DSC) Q2000 (prepared by TA instrument), wherein a specimen was charged in an amount of about 0.5 mg to 10 mg into a measurement container, a nitrogen gas flow rate was set to 10 ml/min, and a temperature raising and lowering cycle including: raising a temperature of polyarylene sulfide from 50° C. to 330° C. at a rate of 20° C./min, then maintaining this state for 5 minutes, and cooling the temperature from 330° C. to 50° C. at a rate of 20° C./min, is performed once, and then is repeated once more at a rate of 20° C./min.

As a result, in the conductive polyarylene sulfide resin composition, there were no changes in values indicating thermal behavior such as Tm, Tc, and the like, and no peak assumed as a newly generated reaction product was found. It could be confirmed from the observation that the two polymers of PPS and PSS in the resin composition were simply mixed.

Figure 2:
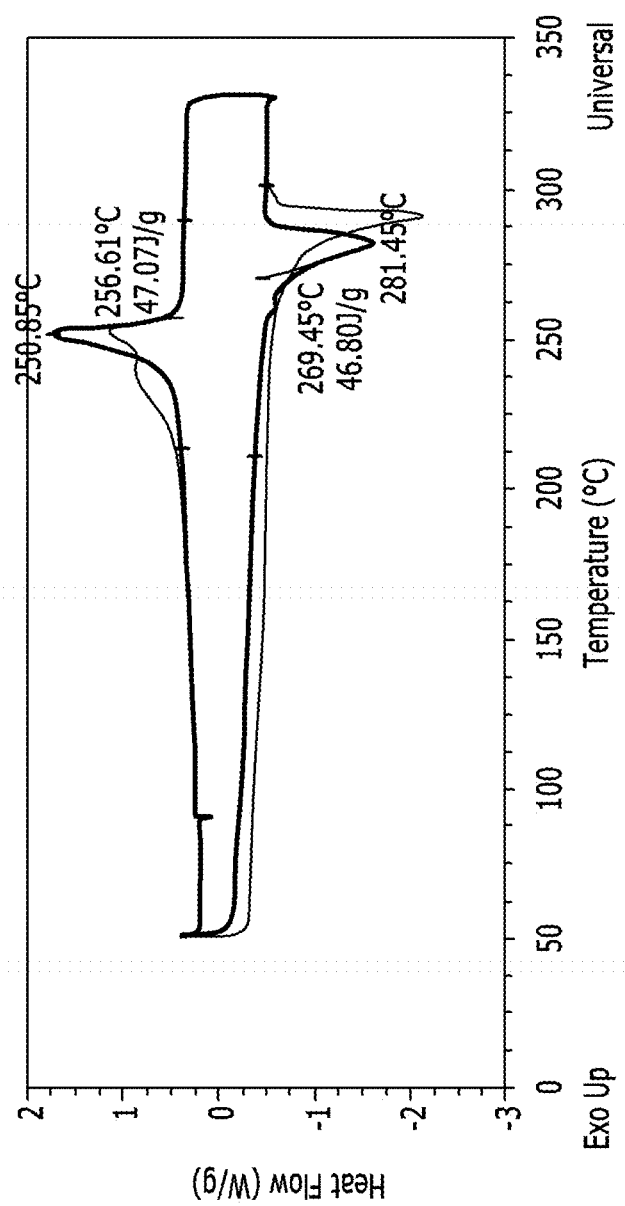
FIG. 2 is a graph showing DSC analysis results of polyphenylene sulfide (PPS).

Meanwhile, as a result of DSC thermal analysis of the conductive polymer film, as shown in FIG. 1, the film had the Tm of 281□ after kneading, and as shown in FIG. 2, there was no change at 281□, which was the Tm value of PPS alone. In addition, the Tc of the film was changed to 251□ (see FIG. 1) after kneading at 250□ which was the Tc value of PPS alone (see FIG. 2), and there was no significant change when comparing the Tc before and after kneading. Further, it could be confirmed that Tg of PSS was 98□ after kneading, and a shoulder peak of PSS was shown at 230□. A change in graph type or large shifts in Tm and Tc values that may be shown when doping or reacting with each other to form a reaction product could not be confirmed in the DSC analysis results. From these results, it could be appreciated that PPS and PSS were included as a simple mixture.

Experimental Example 2: Evaluation of High Temperature Stability of Resin Composition The conductive polyarylene sulfide resin compositions prepared in Example 1 and Comparative Example 1 were maintained at 300□ and 7 MPa for 1 minute to observe the change in composition.

Figure 3:
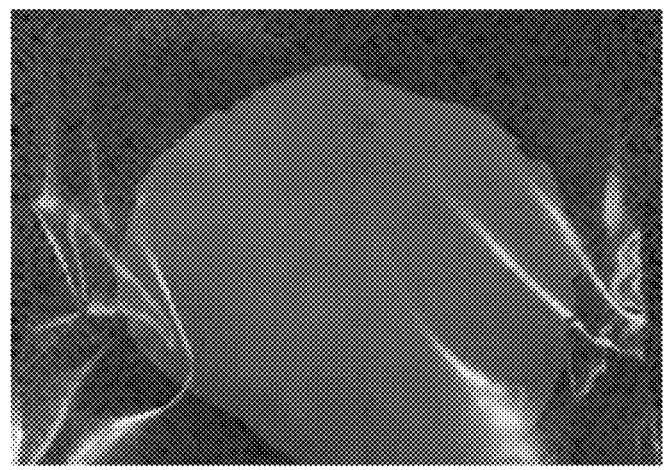
FIG. 3 is an image showing high temperature stability of a conductive polyarylene sulfide resin composition of Comparative Example 1.
Figure 4:
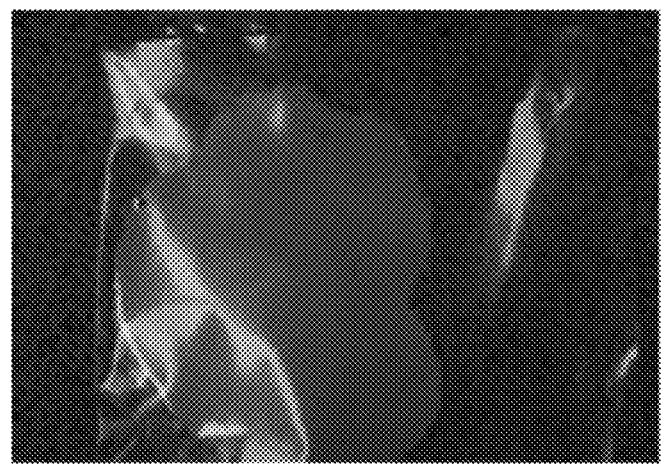
FIG. 4 is an image showing high temperature stability of a conductive polyarylene sulfide resin composition of Example 1.

Results thereof are shown in FIG. 3 and FIG. 4, respectively.

FIG. 3 shows observation results of high temperature stability of the conductive polyarylene sulfide resin composition of Comparative Example 1 and FIG. 4 shows observation results of high temperature stability of a conductive polyarylene sulfide resin composition of Example 1.

As shown in FIGS. 3 and 4, even when the resin composition of Example 1 was maintained at a high temperature for a long period of time, no change in discoloration, or the like, was observed in the resin composition of Example 1. From these results, it could be confirmed that the resin composition of Example 1 in which PSS was further mixed had excellent high temperature stability.

Experimental Example 3: Confirmation of Film Manufacturing Conditions

In order to confirm the film manufacturing conditions at the time of film formation using the conductive polyarylene sulfide resin composition prepared in Example 1, the compositions were each treated under the conditions as shown in Table 1 below and the changes in composition were observed. The Results are shown in FIGS. 5A and 5B, respectively.

TABLE 1

|  | Condition 1 | Condition 2 |
| --- | --- | --- |
| High-temperature pressurization condition | Treated at 310□ for 2 minutes | Treated at 310□ for 5 minutes |

Figure 5A:
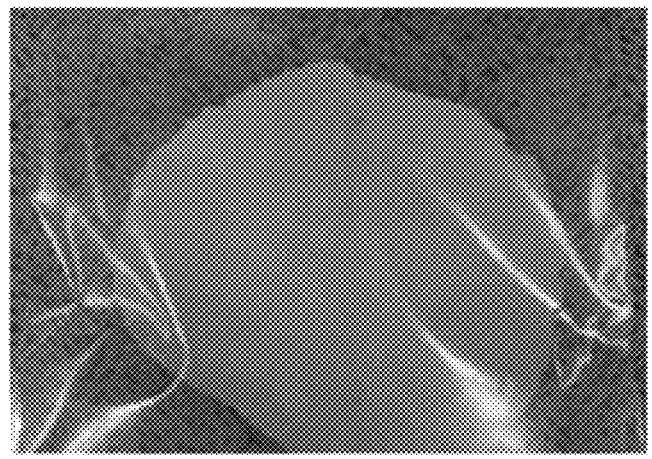
FIG. 5A is an image showing a change in a conductive polyarylene sulfide resin composition under Condition 1 in Experimental Example 3.
Figure 5B:
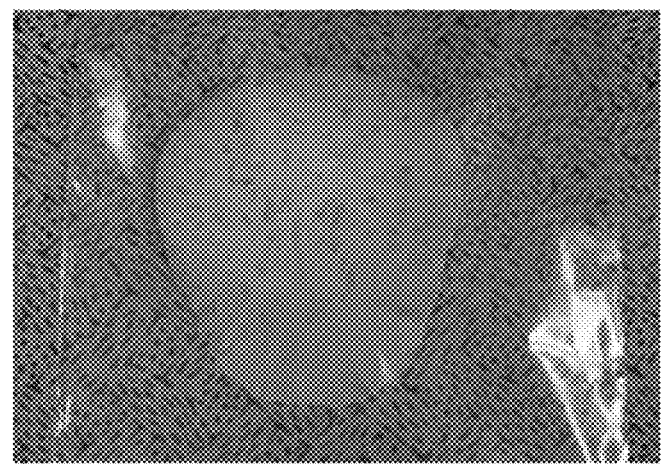
FIG. 5B is an image showing a change in a conductive polyarylene sulfide resin composition under Condition 2 in Experimental Example 3.

As shown in FIGS. 5A and 5B, when the composition was maintained at 310□ for 5 minutes as shown in Condition 2, discoloration occurred due to crosslinking of PPS included in the composition. Thus, it could be appreciated that optimization of the high-temperature pressurization process was required in manufacturing the film using the conductive polyarylene sulfide resin composition according to the present invention.

Experimental Example 4

The sheet resistance of each of the conductive polymer films prepared in Examples 1 to 6 and Comparative Examples 1 to 6 was measured using a 4-point probe. The Results are shown in Table 2 below.

TABLE 2

|  | Binder resin type | Binder resin amount (wt %) | Sheet resistance (Ω/sq) |
| --- | --- | --- | --- |
| Example 1 | PSS-1 (Td: 400° C.) | 5 | $10^{12}$ |
| Example 2 | PSS-1 (Td: 400° C.) | 10 | $10^{11}$ |
| Example 3 | PSS-1 (Td: 400° C.) | 20 | $10^{9}$ |
| Example 4 | PSS-1 (Td: 400° C.) | 30 | $10^{9}$ |
| Example 5 | PSS-1 (Td: 400° C.) | 40 | $10^{9}$ |
| Example 6 | PSS-2 (Td: 320° C.) | 5 | $10^{10}$ |
| Comparative Example 1 | — | — | Specimen was manufactured, but sheet resistance was not measured. |
| Comparative Example 2 | PSS-1 (Td: 400° C.) | 50 | Specimen could not be manufactured. |
| Comparative Example 3 | DDQ (Td: 250-280° C.) | 5 | Specimen could not be manufactured. |
| Comparative Example 4 | DDQ (Td: 250-280° C.) | 20 | Specimen could not be manufactured. |
| Comparative Example 5 | PSS-3 (Td: 250° C.) | 5 | Specimen could not be manufactured. |
| Comparative Example 6 | PSS-3 (Td: 250° C.) | 5 | Specimen could not be manufactured. |

As a result of the experiment, it could be confirmed that in Examples 1 to 6, the sheet resistance value of the film decreased as the amount of the binder resin increased, and in particular, when the binder resin was used in an amount of 20 wt % or more to less than 50 wt %, the sheet resistance value of the film was $10^9$ Ω/sq or more, which is capable of antistatic.

Meanwhile, in Comparative Example 1 in which only PSS was used without the binder resin, the film was manufactured, but the resistance value was not measured since the film of Comparative Example 1 was formed only of non-conductive PPS having no conductivity.

In addition, in Comparative Example 2 in which the same binder resin as in Example 1 was used, but the binder resin was included in an excessive amount, an original film shape was lost and broken by external force due to deterioration of the kneadability of the PPS polymer and the PSS polymer. Therefore, sheet resistance thereof could not be measured.

Further, in Comparative Examples 3 and 4 in which a binder not satisfying the decomposition temperature condition of the binder resin in the present invention was used, the sheet resistance value could not be confirmed. Regardless of the amount of the binder DDQ, the binder was degraded during the manufacture of the film, and thus the film was not manufactured. Even in Comparative Examples 5 and 6 in which PSS-3 (Td: 250☐) not satisfying the decomposition temperature condition due to difference in Mw was used even though the same PSS as in Example 1 was used as the binder resin, a large number of pores were generated and the color of the film was changed to dark brown even though the films were attempted to be manufactured under various conditions, thus resulting in no film formation.

The invention claimed is:

1. A conductive polyarylene sulfide resin composition comprising:
a mixture of polyarylene sulfide and a binder resin, the binder resin having a decomposition temperature (Td) of 310° C. or more, wherein the binder resin comprises at least one selected from the group consisting of polystyrene sulfonate and aromatic sulfonate,
wherein the binder resin is comprised in an amount of 5 wt % or more to less than 50 wt %, based on a total weight of the mixture.

2. The conductive polyarylene sulfide resin composition of claim 1, wherein the polyarylene sulfide is polyphenylene sulfide.

3. The conductive polyarylene sulfide resin composition of claim 1, wherein the polyarylene sulfide has a number average molecular weight of 5,000 to 100,000 g/mol, and a melt mass-flow rate (MFR) of 10 to 10,000 g/10 min, the MFR being measured at 315° C. under a load of 2.16 kg.

4. The conductive polyarylene sulfide resin composition of claim 1, wherein the polyarylene sulfide has a melting temperature (Tm) of 220 to 350° C., and a crystallization temperature (Tc) of 200 to 330° C.

5. The conductive polyarylene sulfide resin composition of claim 1, wherein the binder resin is present in the mixture in an amount of 20 wt % to 40 wt %, based on the total weight of the mixture.

6. The conductive polyarylene sulfide resin composition of claim 1, wherein the binder resin has a weight average molecular weight of 10,000 to 1,000,000 g/mol.

7. A resin composition for forming a conductive polymer film, comprising the conductive polyarylene sulfide resin composition of claim 1.

8. A method for preparing a conductive polymer film comprising: pressurizing and heating the resin composition for forming a conductive polymer film of claim 7 at a temperature of 200 to 350° C. under a pressure of 1 to 10 MPa for 10 seconds or more to 10 minutes or less.

9. A conductive polymer film comprising: polyarylene sulfide and a binder resin, the binder resin having a decomposition temperature (Td) of 310° C. or more in a weight ratio of 95:5 or more to less than 50:50, wherein the binder resin comprises at least one selected from the group consisting of polystyrene sulfonate and aromatic sulfonate,
wherein a thickness is 0.1 to 0.2 mm and a sheet resistance value is $10^9$ to $10^{12}$ Ω/sq.

* * * * *